United States Patent
Malpetti

(10) Patent No.: US 7,971,444 B2
(45) Date of Patent: Jul. 5, 2011

(54) METHOD AND DEVICE FOR CONTROLLING THE INSIDE TEMPERATURE OF A REFRIGERATION COMPARTMENT, IN PARTICULAR OF A REFRIGERATOR OR FREEZER

(75) Inventor: Roberto Malpetti, Lozza (IT)

(73) Assignee: ITW Industrial Components S.R.L., Milan (IT)

( * ) Notice: Subject to any disclaimer, the term of this patent is extended or adjusted under 35 U.S.C. 154(b) by 1093 days.

(21) Appl. No.: 11/422,463

(22) Filed: Jun. 6, 2006

(65) Prior Publication Data

US 2007/0017238 A1    Jan. 25, 2007

Related U.S. Application Data

(63) Continuation-in-part of application No. PCT/IB2005/001646, filed on Jun. 14, 2005.

(30) Foreign Application Priority Data

Jun. 15, 2004 (IT) ............................. TO2004A0397

(51) Int. Cl.
  *F25B 49/00* (2006.01)
(52) U.S. Cl. ............................. 62/228.1; 62/229; 62/440
(58) Field of Classification Search .................. 62/150, 62/151, 152, 153, 214, 228.1, 440, 131, 229
See application file for complete search history.

(56) References Cited

U.S. PATENT DOCUMENTS

| | | | |
|---|---|---|---|
| 2,071,175 | A | 2/1937 | Philipp |
| 2,300,303 | A | 10/1942 | Morrison |
| 2,767,558 | A | 10/1956 | Wallenbrock et al. |
| 3,090,209 | A | 5/1963 | Hubacker |
| 3,107,502 | A | 10/1963 | Herndon et al. |
| 3,164,970 | A | 1/1965 | Hubacker |
| 4,283,920 | A * | 8/1981 | Kainuma et al. ............... 62/126 |
| 4,353,223 | A * | 10/1982 | Dienemann ..................... 62/442 |
| 4,967,568 | A | 11/1990 | Harnden, Jr. et al. |
| 6,044,654 | A | 4/2000 | Igari et al. |
| 2003/0041606 | A1 | 3/2003 | Kim et al. |
| 2003/0182953 | A1 | 10/2003 | Kim et al. |
| 2003/0209019 | A1* | 11/2003 | Lee ................................ 62/131 |
| 2004/0107724 | A1 | 6/2004 | Kim et al. |

FOREIGN PATENT DOCUMENTS

| | | |
|---|---|---|
| DE | 19613859 A1 | 10/1997 |
| FR | 1362189 A | 5/1964 |
| JP | 06082141 A | 3/1994 |
| JP | 10220951 A | 8/1998 |

* cited by examiner

Primary Examiner — Marc E Norman
(74) Attorney, Agent, or Firm — Lowe Hauptman Ham & Berner LLP

(57) ABSTRACT

In an electric refrigeration appliance having at least one refrigeration compartment, a refrigerating arrangement having an evaporator, and a control device that controls the refrigeration compartment temperature and that has a temperature sensor; the temperature sensor is located away from the evaporator and in a portion of a refrigeration compartment volume selected with the exclusion of a first top portion of the refrigeration compartment having a volume equal to roughly 8-10% of the total internal volume of the refrigeration compartment, and with the exclusion of a second front portion of a depth equal to at least 10% of the total inside depth of the refrigeration compartment.

6 Claims, 3 Drawing Sheets

METHOD AND DEVICE FOR CONTROLLING THE INSIDE TEMPERATURE OF A REFRIGERATION COMPARTMENT, IN PARTICULAR OF A REFRIGERATOR OR FREEZER

RELATED APPLICATIONS

The present application is a Continuation-In-Part of International Application No. PCT/IB2005/001646 filed Jun. 14, 2005, and claims priority from, Italian Application Number TO2004A 000397, filed Jun. 15, 2004, the disclosure of which is hereby incorporated by reference herein in its entirety.

FIELD OF THE INVENTION

The present invention relates to a method and device for controlling the inside temperature of a refrigeration compartment, in particular of a refrigerator or freezer, and in particular cooled by a conventional thermal refrigeration cycle. The invention also relates to an electric household appliance implementing the control method.

The refrigeration compartments of normal electric household appliances (refrigerators and/or freezers) are cooled by refrigerating means defined by a refrigeration circuit filled with a fluid, which is compressed by a compressor and then expanded in an evaporator normally located on/in the inner rear wall of the refrigeration compartment. Outside the refrigeration compartment, the appliance has a condenser with a radiator for disposing of the heat withdrawn from inside the refrigeration compartment by expansion of the fluid in the evaporator. This which therefore constitutes the basic elements of the cooling means.

To prevent ice from clogging the evaporator, as a result of the moisture inside the refrigeration compartment, freezing, the temperature of the evaporator must be increased cyclically to above freezing (e.g. to +4 or +5° C.). For which purpose, the temperature sensor of the thermostat the refrigeration compartment is equipped with is located directly on the evaporator, and temperature regulation by the thermostat controls the compressor on/off cycle frequency.

BACKGROUND OF THE INVENTION

It is generally believed that controlling the compressor on/off cycles by directly determining the temperature inside the refrigeration compartment may impair correct cyclic defrosting of the evaporator.

Locating a temperature sensor (electronic or mechanical— the latter in the form of an expansion bulb) directly on the evaporator, when the thermostat (electromechanical or electronic) is normally located inside the refrigeration compartment, normally on the lighting fixture of the refrigeration compartment, obviously poses numerous manufacturing and assembly problems resulting in a relatively high production cost of the end product (appliance).

The same problem of ensuring defrosting of the cooling means, albeit to a much lesser extent, also arises in the case of refrigeration compartments cooled using a Peltier-effect solid-state electronic device, which, however, is much more expensive and therefore cannot be used in ordinary electric household appliances.

SUMMARY OF THE INVENTION

It is an object of the present invention to eliminate the aforementioned drawbacks by providing a method of controlling the inside temperature of a refrigeration compartment, whereby the temperature of the evaporator (or other refrigeration compartment cooling means) need not be determined directly, and which, at the same time, ensures correct cyclic defrosting of the evaporator, and all with a reduction in production cost of the control device and appliance as a whole. It is a further object of the invention to provide a control device, for implementing the above method, which is cheap, compact, highly reliable and accurate.

According to the present invention, there is provided a method and device for controlling the inside temperature of a refrigeration compartment, in particular of a refrigerator or freezer such as those which are commercially available.

More specifically, the temperature control device according to the invention comprises a thermostat, a temperature sensor connected to the thermostat, and control arrangement for controlling refrigerating means of the refrigeration compartment. The control arrangement is itself controlled by the thermostat. The temperature sensor is fitted to a supporting member (typically the lighting fixture inside the refrigeration compartment) which also supports the thermostat and the control device. This supporting member is located in a given portion of the inside volume of the refrigeration compartment.

The method according to the invention therefore determines the inside temperature of the refrigeration compartment directly by means of a temperature sensor which is located distally or "far away" from the refrigerating means and in a given portion of the inside volume of the refrigeration compartment selected with the exception of a first top portion of the volume of the refrigeration compartment having a volume equal to roughly 8-10% of the total inside volume of the refrigeration compartment, and with the exception of a second front portion of a depth equal to at least about 10% of the total inside depth of the refrigeration compartment. A bottom portion of the refrigeration compartment, which is normally too damp to obtain reliable measurements, is also preferably excluded.

The invention also relates to an electric household appliance featuring the temperature control device and method.

In brief, the invention is based on tests demonstrating a direct correlation between the temperature range inside the refrigeration compartment and the temperature of the evaporator, but only within a select portion of the inside volume of the refrigeration compartment. Here and hereinafter, the term "direct correlation" is intended in the sense that variations in the temperature of the evaporator and inside the refrigeration compartment, related to the on/off cycles of the refrigerating means (compressor), are in phase with one another.

Using electromechanical or electronic thermostats, the cost of providing a temperature sensor "on" the evaporator can therefore be eliminated, thus reducing the end cost of the temperature control device by about one order of magnitude, and with no loss in precision or reliability, which, in fact, are even improved.

Moreover, in the case of an electronic thermostat, the electronic temperature sensor can be integrated in the same electronic board as the thermostat, with considerable advantages in terms of manufacture, cost reduction, size and assembly.

In the non-limiting embodiment described below, an open-door sensor is also advantageously integrated with the temperature control device to take into account any extemporaneous alterations in the temperature range inside the refrigeration compartment caused by frequent opening of the door.

BRIEF DESCRIPTION OF THE DRAWING

A non-limiting embodiment of the present invention will be described by way of example with reference to the accompanying drawings, in which.

DETAILED DESCRIPTION OF THE EXEMPLARY EMBODIMENTS

Figure 1:
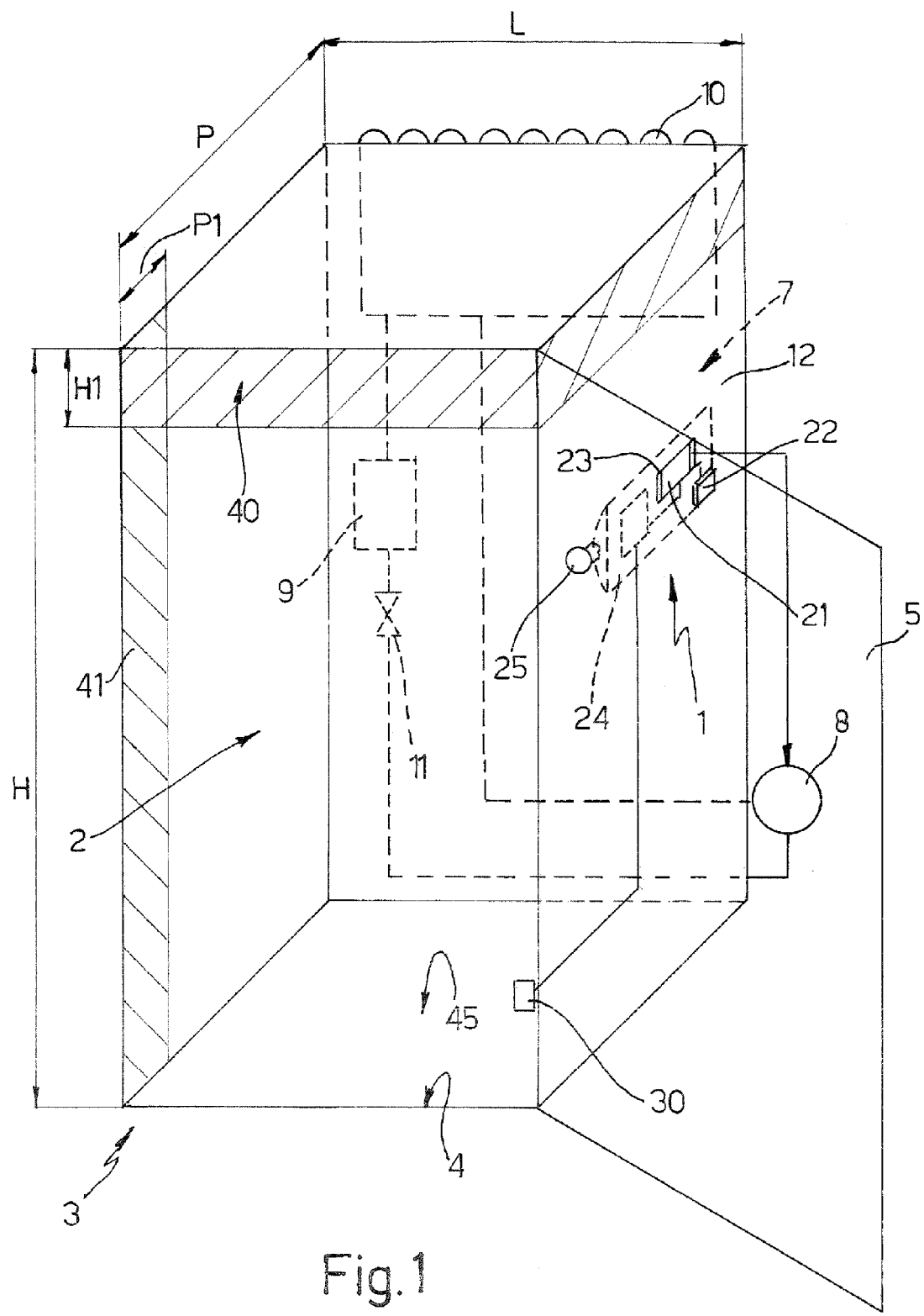
FIG. 1 shows schematically an electric household appliance having a refrigeration compartment and implementing the method and device for controlling the inside temperature of the refrigeration compartment according to the invention.

Number 1 in FIG. 1 indicates, as a whole, a device for controlling the inside temperature of a refrigeration compartment 2, in particular of an electric household appliance 3 (refrigerator or freezer), accessible through a door opening 4 and fitted with a known door 5.

Appliance 3 comprises refrigerating arrangement defined by a known refrigeration circuit 7 (shown partly by dash lines) comprising a compressor 8, an evaporator 9, a condenser/radiator 10, and an expansion valve 11. The condenser/radiator 10 is located outside refrigeration compartment 2, and evaporator 9 is, in this embodiment, disposed on/in a rear wall 12, opposite and facing door opening 4, of refrigeration compartment 2.

Device 1 comprises a thermostat 21; a temperature sensor 22 connected to thermostat 21; and a control device 23 which controls the refrigerating circuit 7 and which itself is responsive to thermostat 21. According to the invention, temperature sensor 22 is fitted to a supporting member 24, which also supports thermostat 21 and control device 23. The supporting member 24 is located within a specific portion of the internal volume of the refrigeration compartment 2.

More specifically, the supporting member 24 is, in this particular embodiment, a lighting fixture which is provided in the refrigeration compartment 2 and which is provided with a bulb or other light source 25.

In the non-limiting embodiment shown, the temperature sensor 22 is a known electronic sensor, and the thermostat 21 is an electronic thermostat producing an electric control signal for controlling the refrigerating circuit 7. More specifically, the electronic thermostat 21, the electronic temperature sensor 22, and the control device 23 are integrated on one electronic board fitted to lighting fixture 24, and control the on/off cycles of the compressor 8.

Alternatively, the temperature sensor 22 may be defined by a mechanical arrangement, such as an expansion bulb, while the thermostat 21 may be a known electromechanical thermostat. However, in this instance, to ensure optimum performance of the invention, the electromechanical thermostat 21 preferably has a low-hysteresis plenum chamber.

In both the embodiments described (electronic and electromechanical thermostat), the device 1 may also comprise an open-door sensor 30 which is configured, for example, to detect a door associated with the door opening 4 being open.

Sensor 30 is preferably associated with the all-electronic device 1, wherein the sensor 22, the thermostat 21, and the control device 23 are mounted on one electronic (viz., circuit) board.

According to the invention, the sensor 22 is located inside refrigeration compartment 2, in a specific portion of the volume of the refrigeration compartment 2. This location is also compatible with good lighting of the inside of the refrigeration compartment 2, and is one of the reasons why the sensor 22 is fitted to the lighting fixture 24.

In short, the temperature sensor 22 of an appliance 3 is, in accordance with this embodiment of the invention, located away from the refrigerating circuit 7 (i.e. the evaporator 9), and in a specific portion of the inside volume of refrigeration compartment 2 selected with the exclusion of a first top portion 40 and a second, depth portion 41 of refrigeration compartment 2, both indicated schematically by hatching in FIG. 1.

More specifically, portion 40 is a volume portion of refrigeration compartment 2, and has a volume V1 equal to roughly 8-10% of the total internal volume V of refrigeration compartment 2. If, therefore, with reference to FIG. 1, refrigeration compartment 2 is parallelepiped-shaped with inside dimensions equal to a height H, a depth P, and a width L, volume V is given by the equation:

$$V = H \times P \times L \quad (1)$$

whereas, if H1 is the height of top portion 40 of volume V1 of refrigeration compartment 2, volume V1 is given by the equation:

$$V1 = H1 \times P \times L \quad (2)$$

and, according to the invention, the following equation applies:

$$V1 = (K)\% \, V \quad (3)$$

where K is at least a value ranging between 8 (for small refrigeration compartments) and 10 (for large refrigeration compartments).

Conversely, front portion 41 is a depth portion of refrigeration compartment 2, in the sense that, if P1 is the depth of portion 41, according to the invention, the following equation applies:

$$P1 = K1\% \, P \quad (4)$$

where K1 is at least a value of 10, and volume $V_2$ of portion 41 is given by the equation:

$$V2 = P1 \times H \times L \quad (5)$$

In short, according to the invention, temperature sensor 22 may be located inside refrigeration compartment 2, but with the exclusion of portions 40 and 41, which obviously overlap at the top front part of refrigeration compartment 2. Whereas, however, the critical parameter of portion 40 is its volume, which, as stated, must be at least 8-10% of the total volume of refrigeration compartment 2, the critical parameter of portion 41 is its depth P1, regardless of its volume V2.

The above relationships were confirmed by testing as follows.

EXAMPLE 1

In a refrigerator/freezer of normal type, i.e. without any antifrost fan, with two refrigeration compartments temperature-controlled by one refrigeration circuit 7, a number of thermocouples were placed in various positions inside the volume of the two refrigeration compartments. Another thermocouple was placed directly on the evaporator. Room temperature was also monitored. The monitoring was carried out for a time sufficient for the refrigeration circuit 7 to induce a number of on/off cycles of the compressor 8 under the control of a thermostat connected to the thermocouple on the evaporator.

Figure 2:
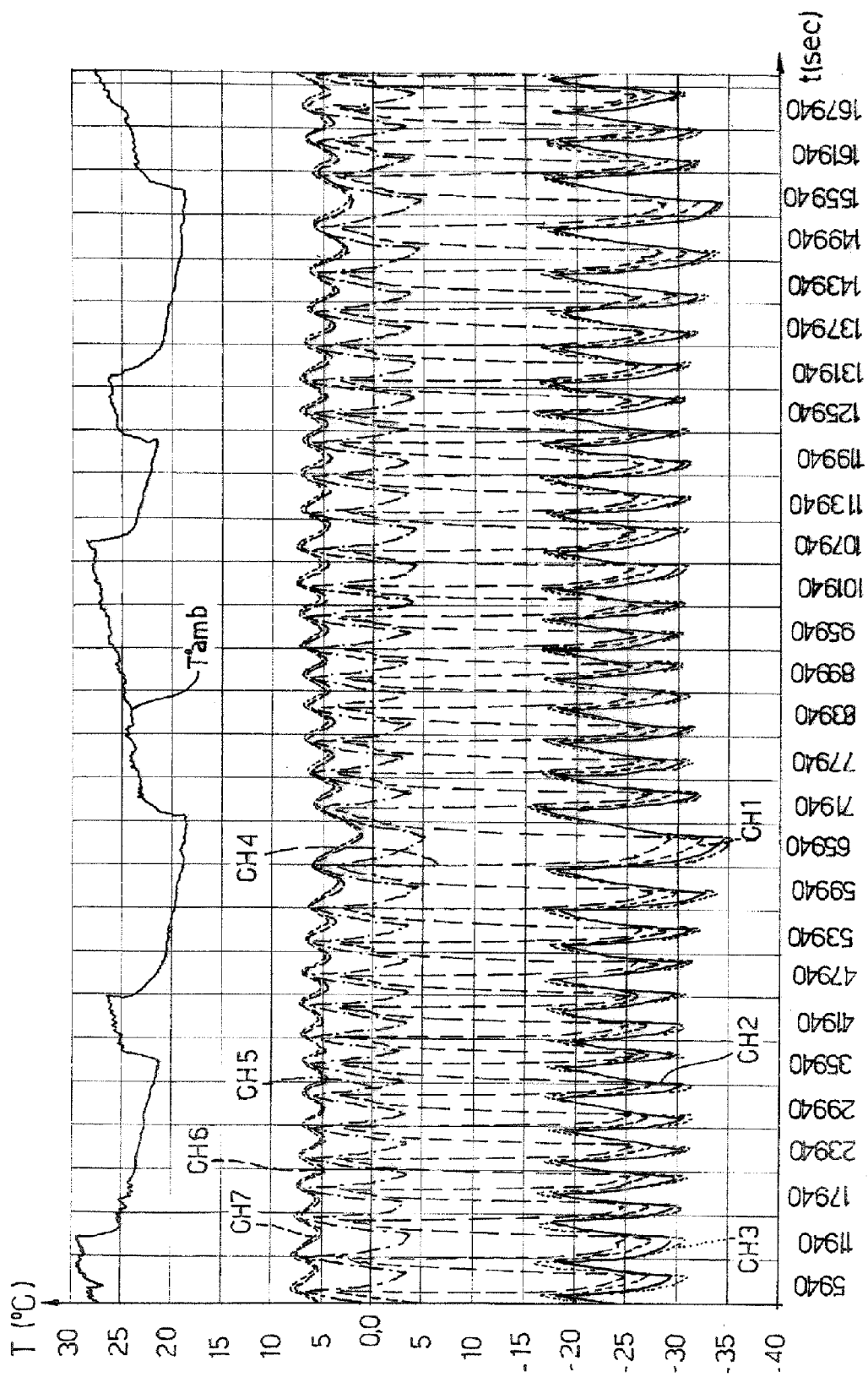
FIG. 2 shows a graph of the temperature range inside refrigeration compartments of a refrigerator and freezer served by the same evaporator, compared with the temperature of the evaporator and room temperature.

The test results, limited to three (most significant) thermocouples (indicated as "CH" in FIG. 2) for each refrigeration compartment, are shown in FIG. 2. As can be seen, the tests conducted by the Applicant surprisingly show how, with the exception of volume portions 40 and 41 as defined above, the temperatures inside the two refrigeration compartments (one of which was maintained constantly below zero centigrade) are at all times in phase with each other and with the temperature of the evaporator, in the sense that the graphs are not only similar, but have perfectly matching maximum and minimum points.

EXAMPLE 2

Figure 3:
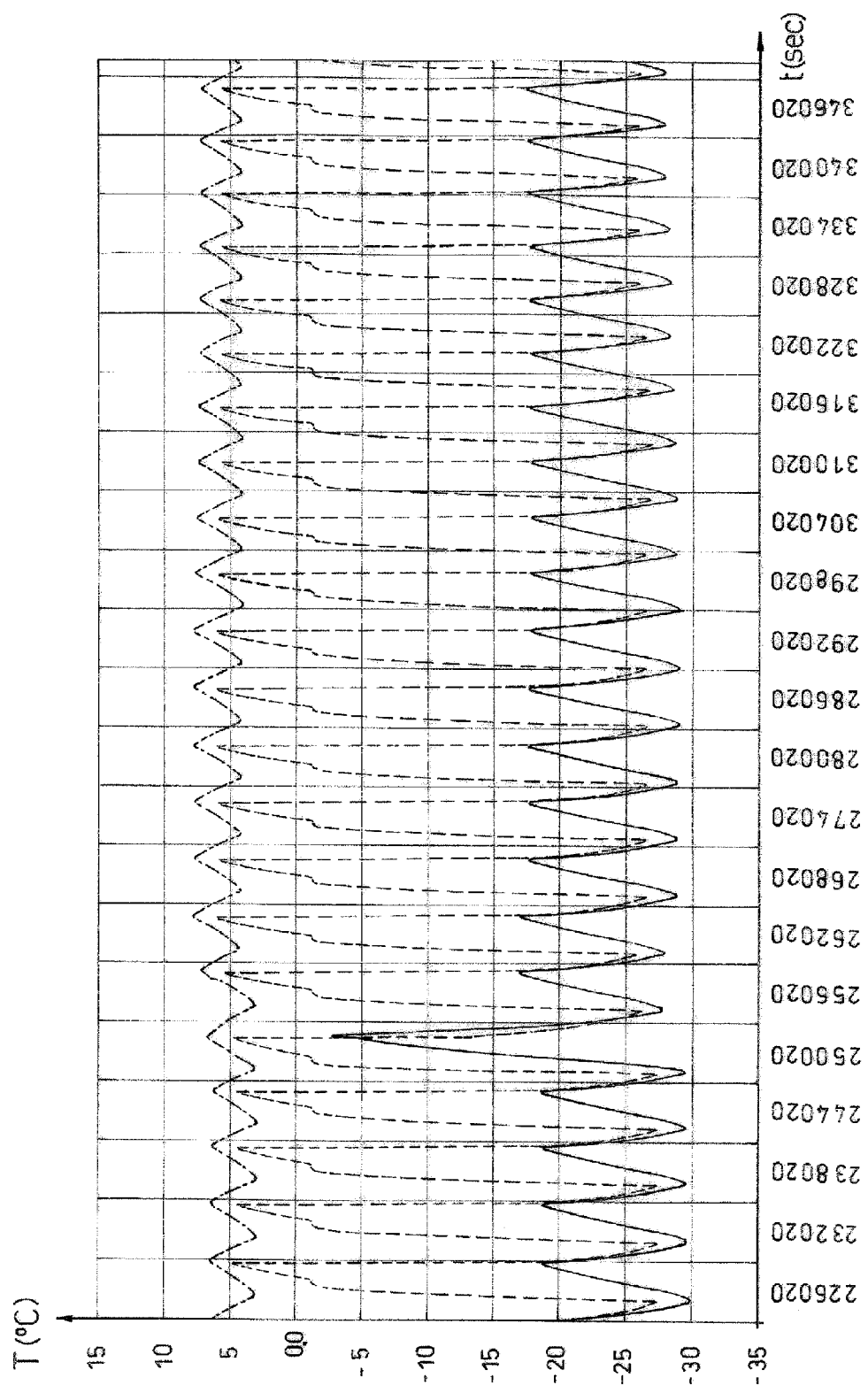
FIG. 3 shows the same graph of FIG. 2 in case the refrigerator is of the no-frost type, i.e. provided with a fan for circulation air between the freezer compartment and the fridge compartment.

The same test of EXAMPLE 1 was repeated with a refrigerator/freezer of the no-frost type, i.e. with two refrigeration compartments, one below zero centigrade (freezer) temperature-controlled by one refrigeration circuit 7, and one above zero centigrade (fridge compartment) the temperature of which is controlled in and indirect way by means of an hydraulic connection with the freezer, the opening of which is controlled by a partitioning device known as "damper", and the use of a fan, which circulates cold air between the freezer and the fridge compartment. The experimental results are shown in FIG. 3 wherein only three thermocoulples are used, one placed on the lamp (so within the fridge compartment), one on the evaporator of circuit 7 and one placed in the freezer compartment. Again, the temperatures inside the two refrigeration compartments (one of which was constantly below zero centigrade) are at all times in phase with each other and with the temperature of the evaporator, in the sense that the graphs are not only similar, but have perfectly matching maximum and minimum points.

Such performance as shown in EXAMPLES 1 and 2 was in no way predictable and, in fact, was unexpected.

Given the above test results, according to the invention, an electric household appliance 3 of any type, e.g. either of normal (without fan) or no-frost (with fan and a "damper" device) type, as described previously may therefore be produced, in which refrigeration circuit 7 is controlled by a device 1, whose control device 23 (e.g. defined by an electronic (circuit) board with a programmable microchip with appropriately implemented software) provide for so controlling the on/off cycles of compressor 8 as to maintain a programmed temperature inside refrigeration compartment 2, and the same time provide for cyclic defrosting of evaporator 9, despite the temperature variation information being supplied to thermostat 21 by a sensor 22 located inside refrigeration compartment 2, as opposed to on evaporator 9.

The method of controlling the inside temperature of refrigeration compartment 2 according to the invention therefore comprises the step of acquiring a temperature signal by means of a temperature sensor (sensor 22), and the step of processing the temperature signal to selectively control the refrigerating circuit 7; the step of acquiring the temperature signal being performed by placing sensor 22 in a position remote from or "far away" from the refrigerating circuit 7 (in particular, from evaporator 9) and in a specific portion of the inside volume V of refrigeration compartment 2 selected with the exclusion of first top portion 40 and second front portion 41, and therefore having a volume VT according to the equation:

$$VT = V1 + V2 - (H1 \times P1 \times L) \qquad (6)$$

to take into account overlapping of volumes V1 and V2.

The specific portion of the inside volume of refrigeration compartment 2 in which to place temperature sensor 22, according to the invention, is also selected by preferably excluding the bottom portion of refrigeration compartment 2, i.e. the volume portion close to a bottom wall 45, which, in conventional refrigerators, is normally occupied by drawers and would therefore be excluded for practical reasons.

As stated, sensor 22 may be either an expansion bulb or an electronic sensor. In the first case, the temperature signal is in the form of a variation in the volume of a fluid in the expansion bulb, and the step of processing the temperature signal and controlling refrigerating circuit 7 is performed by an electromechanical thermostat connected to the bulb in known manner.

In the second case, the temperature signal comprises an electric signal, and the step of processing the temperature signal and controlling refrigerating circuit 7 is performed by an electronic thermostat connected to the temperature sensor.

In both cases, the step of selectively controlling refrigerating circuit 7 comprises a step of cyclically turning the compressor 8 on and/or off.

Particularly in the case of an electronic thermostat, the method according to the invention also comprises a step of determining opening of door 5, so as to implement in control device 23 a correction algorithm, which is only activated when door 5 is open (or opened frequently).

The invention claimed is:
1. A method of controlling a refrigeration compartment temperature comprising:
   acquiring a temperature signal using a temperature sensor, and
   processing the temperature signal to selectively control a fan-free, convection cooled refrigerating arrangement associated with the refrigeration compartment;
   wherein processing the temperature signal is carried out on the basis of a direct correlation between the temperature range inside the refrigeration compartment as acquired by the temperature sensor and the temperature on an evaporator of the refrigerating arrangement, and
   wherein the temperature sensor is located away from the refrigerating arrangement and in a specific portion of the refrigeration compartment volume, selected with the exclusion of a first top portion of the volume of the refrigeration compartment having a volume equal to roughly 8-10% of the total inside volume of the refrigeration compartment, and with the exclusion of a second front portion of a depth equal to at least 10% of the total inside depth of the refrigeration compartment.

2. A method as claimed in claim 1, wherein the specific portion of the refrigeration compartment volume is selected by also excluding a bottom portion of the refrigeration compartment.

3. A method as claimed in claim 1, wherein:
   the temperature sensor comprises an expansion bulb;
   the temperature signal being in the form of a variation in the volume of a fluid in the expansion bulb; and
   the processing of the temperature signal and the controlling the refrigerating arrangement is performed by means of an electromechanical thermostat connected to the expansion bulb.

4. A method as claimed in claim 1, wherein:
the temperature sensor is an electronic sensor;
the temperature signal comprising an electric signal; and
the processing of the temperature signal and the controlling the refrigerating arrangement is performed by means of an electronic thermostat connected to the temperature sensor.

5. A method as claimed in claim 1, wherein the refrigerating arrangement comprises a refrigeration circuit comprising a compressor, and wherein the step of selectively controlling the refrigerating arrangement comprises cyclically turning the compressor on and/or off.

6. A method as claimed in claim 1, further comprising determining an opening of a door to the refrigeration compartment.

\* \* \* \* \*